(12) United States Patent  (10) Patent No.: US 9,776,503 B1
Labbe  (45) Date of Patent: Oct. 3, 2017

(54) NONSPILL FUEL FILLER ADAPTER

(71) Applicant: Robert A. Labbe, Bristol, CT (US)

(72) Inventor: Robert A. Labbe, Bristol, CT (US)

(73) Assignee: Underway Marine LLC, Bristol, CT (US)

( * ) Notice: Subject to any disclaimer, the term of this patent is extended or adjusted under 35 U.S.C. 154(b) by 0 days.

(21) Appl. No.: 15/449,344

(22) Filed: Mar. 3, 2017

Related U.S. Application Data

(63) Continuation of application No. 15/259,989, filed on Sep. 8, 2016.

(51) Int. Cl.
B60K 15/077 (2006.01)
B60K 15/04 (2006.01)

(52) U.S. Cl.
CPC ...... *B60K 15/04* (2013.01); *B60K 2015/0458* (2013.01); *B60K 2015/0477* (2013.01)

(58) Field of Classification Search
CPC .............. B60K 15/0406; B60K 15/04; B60K 2015/0458; B60K 2015/049
USPC ..................... 220/86.2, 86.1, 86.3
See application file for complete search history.

(56) References Cited

U.S. PATENT DOCUMENTS

| | | | |
|---|---|---|---|
| 3,044,270 A | 7/1962 | Biever | |
| 3,979,010 A | 9/1976 | Fiedler et al. | |
| 4,143,690 A | 3/1979 | Dunicz | |
| 4,768,566 A * | 9/1988 | Ito | B60K 15/04 137/588 |
| 4,782,974 A | 11/1988 | Elkayam | |
| 5,111,858 A | 5/1992 | Aittama et al. | |
| 5,839,489 A | 11/1998 | Ganachaud et al. | |
| 5,860,460 A | 1/1999 | Hidano et al. | |
| 6,330,893 B1 | 12/2001 | O'Connell | |
| 6,405,767 B1 | 6/2002 | Marsala et al. | |
| 6,523,582 B2 | 2/2003 | Furuta | |
| 6,588,459 B2 | 7/2003 | O'Connell | |
| 6,886,613 B1 | 5/2005 | Zahdeh | |
| 7,059,365 B2 | 6/2006 | O'Connell | |
| 7,243,678 B2 | 7/2007 | Banerjee et al. | |
| 7,343,942 B2 | 3/2008 | O'Connell | |
| 7,540,311 B2 * | 6/2009 | Quigg | B60K 15/04 141/287 |
| 7,926,522 B2 * | 4/2011 | Aitken | B60K 15/04 141/301 |
| 7,997,306 B2 | 8/2011 | Kobayashi et al. | |
| 9,016,330 B2 * | 4/2015 | Hunt | B60K 15/03 123/1 A |
| 9,315,099 B2 | 4/2016 | Whelan et al. | |
| 2006/0032552 A1 * | 2/2006 | Hedevang | B60K 15/04 141/367 |
| 2007/0169845 A1 | 7/2007 | Benjey et al. | |

(Continued)

*Primary Examiner* — J. Gregory Pickett
*Assistant Examiner* — Niki M Eloshway
(74) *Attorney, Agent, or Firm* — St Onge Steward Johnston and Reens LLC

(57) ABSTRACT

A fuel filler adapter has a hollow body having a base end with a flange extending outwardly therefrom, and a forward end, and has a length of between 0.5 inch and 2.5 inches. A bore extends through the body at an angle of between 2.5° and 15° so that the adapter can be fitted onto a fuel nozzle. Fueling spitback is prevented by a helical fuel path which does not block air from venting from a fuel tank. Air venting from the fuel tank exits through the fuel filler adapter via one or more venting channels.

22 Claims, 16 Drawing Sheets

(56) References Cited

U.S. PATENT DOCUMENTS

| | | |
|---|---|---|
| 2008/0128415 A1 | 6/2008 | O'Connell |
| 2015/0183315 A1 | 7/2015 | Kapaun |
| 2016/0059692 A1 | 3/2016 | Kito et al. |
| 2016/0075230 A1 | 3/2016 | Goto et al. |

* cited by examiner

US 9,776,503 B1

NONSPILL FUEL FILLER ADAPTER

FIELD OF THE INVENTION

The present invention relates to systems for transferring liquid from a liquid source to a liquid container. More specifically, the present invention relates to a nonspill fuel filler adapter, for used with a fuel nozzle when filling a fuel tank with fuel, that minimizes fuel spillage. The fuel filler adapter is particularly adapted for in filling boat fuel tanks.

BACKGROUND OF THE INVENTION

The design of marine fuel systems is regulated by several sections of the Code of Federal regulations including 33 CFR §§183.501-183.590. Fuel tank systems are required to not leak when pressure tested at 3 psig or higher if the fuel tank is rated at a higher pressure. At the same time, the fuel tank system is required to have a vent system that prevents pressure in the tank from exceeding 80 percent of the pressure marked on the tank label. 33 CFR §§183.520. This regulation defines the requirement that the vent system vent excess pressure if volatile fuels vaporize and cause a pressure buildup in the system, to reduce the chance of an explosion.

Fuel tanks in boats commonly have a closable fuel cap, an inlet, a connecting pipe or hose, and a remote fuel tank which receives fuel via the pipe or hose. Fuel is pumped into the inlet from a gasoline or diesel fuel pump through the pump nozzle and then flows by gravity via the pipe or hose to the fuel tank.

A common problem in filling such marine fuel storage systems with fuel is that fuel entering the tank displaces air in the empty tank, causing an outflow of air from the tank, up the hose or pipe and out of the inlet. The flow of displaced air bubbles up through the incoming fuel, causing blockages and instabilities in the fuel flow. The periodic bubbles disrupt fuel flow in the pipe or hose, and can cause fuel to be pushed back. These problems are most common in motorboat and sailboat fuel storage systems where it is common for the gas inlet to be placed on a horizontal surface, with the pipe or hose to be positioned vertically. Entering fuel travels downwardly, and exiting air travels upwardly. With both streams in the same passage each stream impedes each other's flow. A bubble of air moving upwardly can push on the incoming fuel and causes fuel to splash or spill out of the inlet. This problem is commonly referred to as "spitback." Note that the fuel tank vent system required by 33 CFR §§183.520 is not effective to release air in the tank during filling because the pressure is usually insufficient to open the vent system.

Furthermore, it noted that prior to 2009, marine fueling stations were not required to have the full tank fuel flow cutoff which is standard in automobile fueling systems. While full tank fuel flow cutoffs are now standard, they are not effective to cutoff fuel flow when they encounter a bubble of air and fuel typical of a spitback condition.

It is to be appreciated that the extent of the spitback problem varies widely in both existing vessels and new vessels. Depending on the particular design of the fuel system layout there may be no problems at all if there is a larger diameter angled fuel pipe leading from the inlet to the fuel tank which allows the streams of air and fuel to separate and travel in separate paths; but if there is a smaller diameter fuel pipe or a vertical fuel pipe or a fuel pipe with many bends then the problem of spitback is an inevitable problem.

40 CFR 1060.101(f)(3) became effective on or before Jul. 31, 2011 and attempts to provide a design requirement for all fuel systems that the systems be designed to avoid spitback:

Refueling. For any equipment using fuel tanks that are subject to diurnal or permeation emission standards under this part, you must design and build your equipment such that operators can reasonably be expected to fill the fuel tank without spitback or spillage during the refueling event. The following examples illustrate designs that meet this requirement:

(i) Equipment that is commonly refueled using a portable gasoline container should have a fuel tank inlet that is larger than a typical dispensing spout. The fuel tank inlet should be located so the operator can place the nozzle directly in the fuel tank inlet and see the fuel level in the tank while pouring the fuel from an appropriately sized refueling container (either through the tank wall or the fuel tank inlet). We will deem you to comply with the requirements of this paragraph (f)(3)(i) if you design your equipment to meet applicable industry standards related to fuel tank inlets.

(ii) Marine SI vessels with a filler neck extending to the side of the boat should be designed for automatic fuel shutoff. Alternatively, the filler neck should be designed such that the orientation of the filler neck allows dispensed fuel that collects in the filler neck to flow back into the fuel tank. A filler neck that ends with a horizontal or nearly horizontal segment at the opening where fuel is dispensed would not be an acceptable design.

However, this new regulatory requirement does not alter the spitback problem experienced with many preexisting boats and other marine vessels. And even new vessels can conceivably still experience the problem.

The spitback splashes and spills of fuel can be an environmental problem. A fuel spill into a waterway is a violation of Clean Water Act regulations. Furthermore, a spill in a marine environment is difficult to contain; it is often difficult to capture the spilled fuel and to prevent the spread of spilled fuel. A fuel spill can cause other economic damage, for example, damage the marine vehicle, docks, or filling station. There are other potential risks such as fire hazards and damage to human health from exposure to gasoline.

There is a need for a nonspill fuel filler adapter and a nonspill fuel filler inlet to enable transfer of fuel from a fuel pump via a fuel nozzle to a fuel fill/pipe or hose/tank that reduces or prevents spillage. There is a need for a device that minimizes the volatile and harmful emissions of fuel vapor during the fueling process to reduce the risk of fire and exposure to hazardous substances. There is a further need for a device that cooperates with the automatic shut-off systems of fuel dispensers to maintain their ability to prevent overflow.

SUMMARY OF THE INVENTION

In order to overcome the deficiencies of the prior art and to achieve at least some of the objects and advantages listed a fuel filler adapter and a fuel filler inlet are disclosed. The fuel filler adapter comprises a hollow body having a base end and a forward end. The adapter forward end is sized to be positioned into the fuel fill and fuel pipe. A flange extends outwardly from the base end of the body and is sized so that it is larger than the fuel fill such that the flange prevents the adapter from falling into the fuel fill and pipe. A bore extends through the body from the base end to the forward end at an angle of between 2.5° and 15° relative to a central axis of the body. Preferably, the bore extends through the body at an angle of between 5° and 10° relative to the central axis of the body, and most preferably, the bore extends through the body at an angle of 7° relative to the central axis of the body. The fuel filler adapter has a length of between 0.5 inch and 2.5 inches, preferably between 1.0 inch and 2.0 inches.

The bore is sized to receive a gasoline or diesel fuel pump nozzle, and the bore angle is selected such that when the fuel filler adapter is fitted onto a fuel pump nozzle, and the nozzle and adapter are placed in a fuel fill, the fuel nozzle will be positioned with the nozzle tip located adjacent to and/or against the inner walls of the vehicle's fuel pipe or hose. Fuel which is pumped into the fuel fill will flow onto the inner walls and will tend to follow a helical path along the inner walls of the fuel pipe or hose. This helical or vortex flow of fuel is advantageous because a central part of the fuel pipe or hose will remain clear, allowing for air to continuously escape the fuel tank as it is filled with fuel. Escaping air is then vented to the atmosphere via the fuel filler adapter. In this way, the problem of spitback is eliminated The body outer walls have a curved cross-sectional shape, which is preferably a circle, or more preferably, a partial circular shape having curved and flat areas. The partial circular shape is a truncated circle cross-sectional shape.

In one embodiment, the fuel filler adapter body has outer walls having a substantially constant cross-sectional shape and a small flange and can drop into the fuel fill. In other embodiments, the fuel filler body has outer walls has a cylindrical forward end or a conical forward end, and a large flanged base that seats on the fuel fill.

In one embodiment, the fuel filler adapter is sized to receive a gasoline nozzle, and the bore has a diameter of 0.825 inch; preferably, the body is provided with in whole or in part with a red coloration to indicate gasoline. In another embodiment, the fuel filler adapter is sized to receive a diesel fuel nozzle, and the bore has a diameter of 0.950 inch; and the body is provided with in whole or in part with a green coloration to indicate diesel fuel.

Another aspect of the invention is a fuel filler inlet provided for use in new boat construction or retrofitting. The fuel filler inlet is adapted to connect to a fuel pipe or hose and has a hollow cylindrical body having a flanged base end that sits on a boat deck or gunwale, a fuel inlet bore extending through the body at an angle of between 2.5° and 15° relative to a central axis of the body; and one or more venting channels extending through the body.

DETAILED DESCRIPTION OF THE INVENTION

Figure 11A:
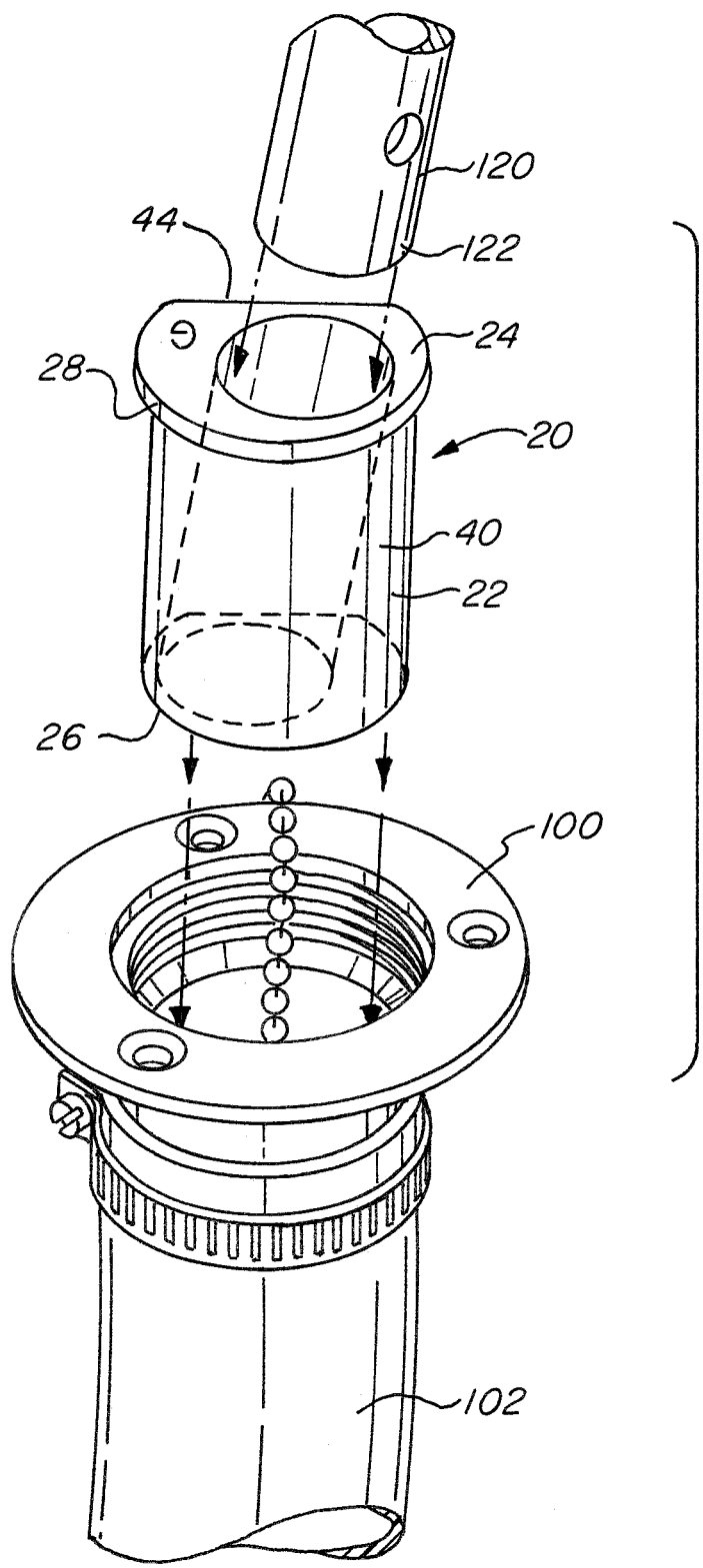
FIG. 11a is a perspective exploded view showing a fuel nozzle, a nonspill fuel filler adapter in accordance with FIG. 1 or 6, and a fuel fill and fuel pipe/hose.
Figure 11B:
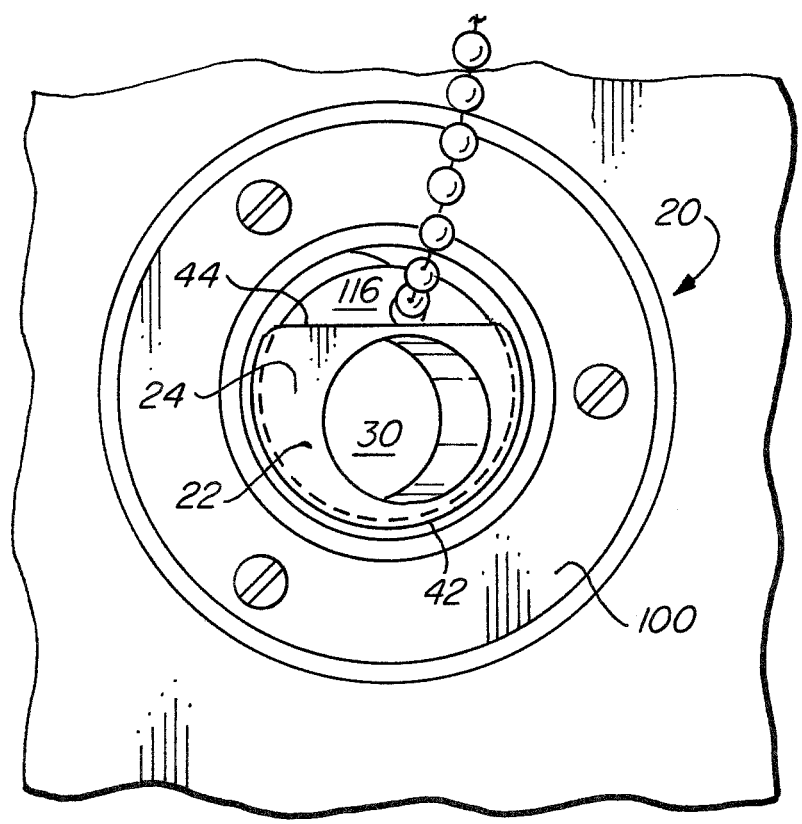
FIG. 11b is a top plan view showing a nonspill fuel filler adapter in accordance with FIG. 1 or 6, and a fuel fill.
Figure 12:
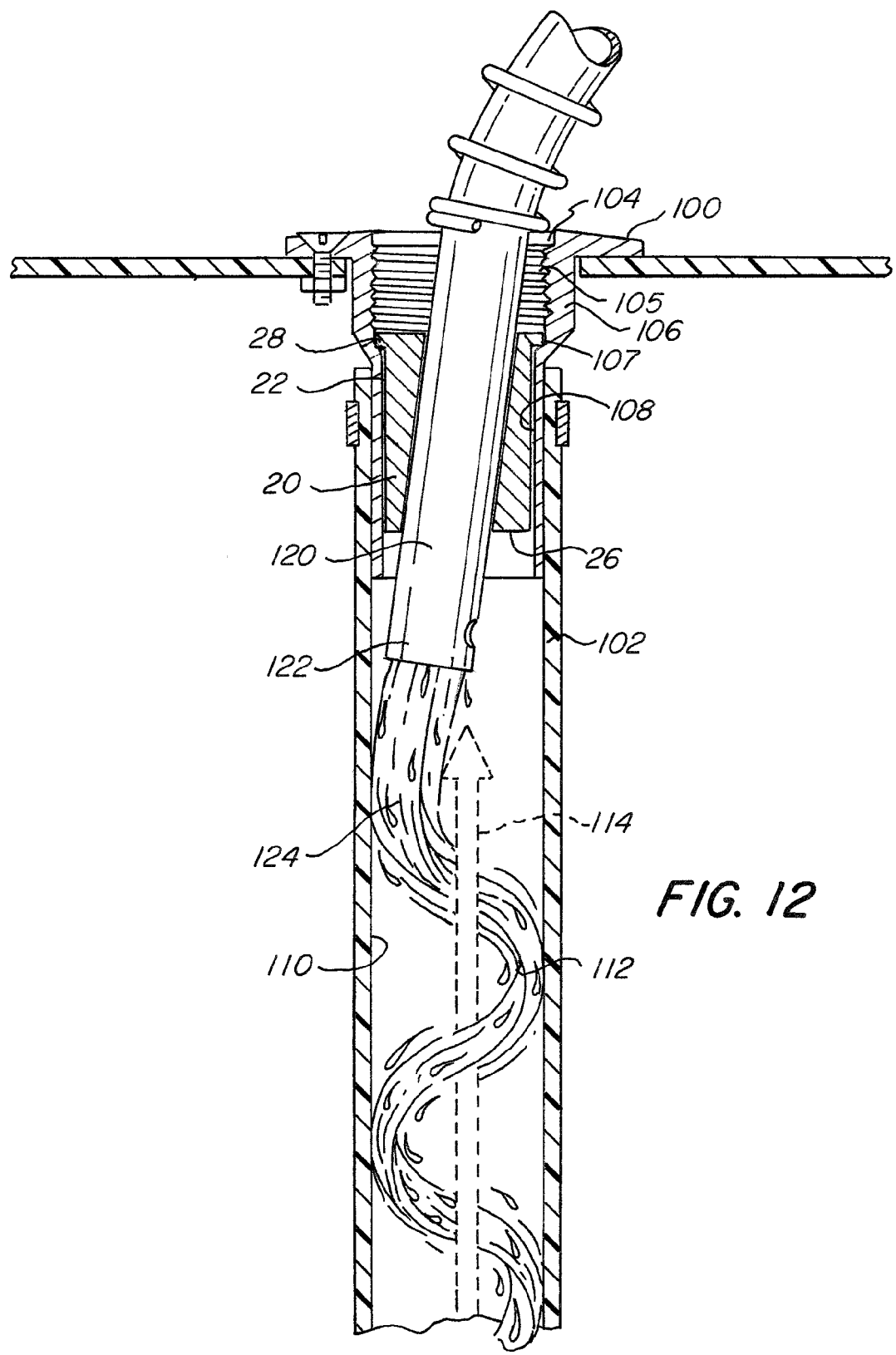
FIG. 12 is a cross-section view showing the fuel nozzle, nonspill fuel filler adapter in accordance with FIG. 1 or 6, fuel fill and fuel pipe/hose of FIG. 11 with fuel being dispensed from the fuel nozzle into the fuel fill and fuel pipe/hose.
Figure 13:
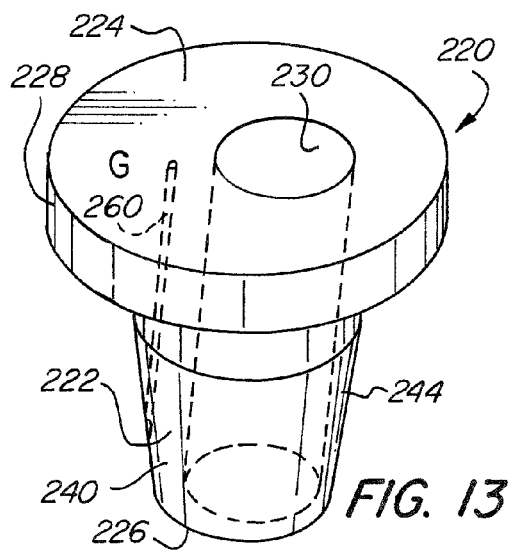
FIG. 13 is a top, front and left side perspective view of a third embodiment of a nonspill fuel filler adapter of the present invention adapted for use with a gasoline fuel nozzle.
Figure 14:
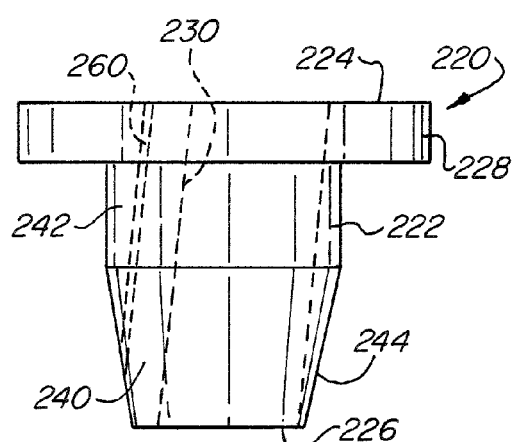
FIG. 14 is a front elevation view thereof.
Figure 16:
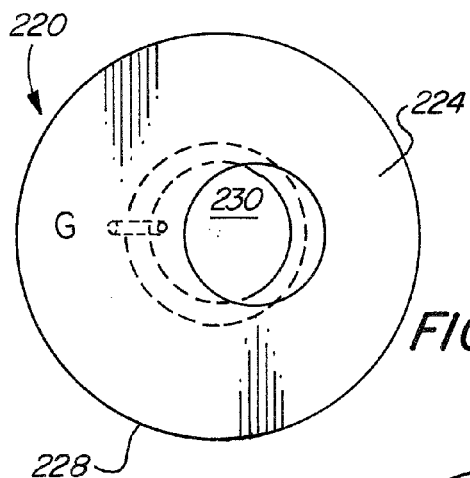
FIG. 16 is a top plan view thereof.
Figure 15:
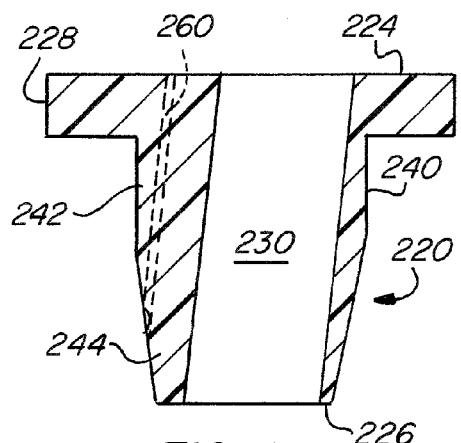
FIG. 15 is a front cross-sectional view thereof.
Figure 17:
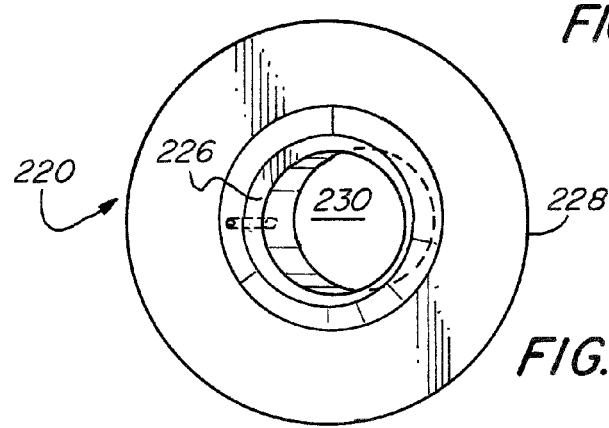
FIG. 17 is a bottom plan view thereof.
Figure 18:
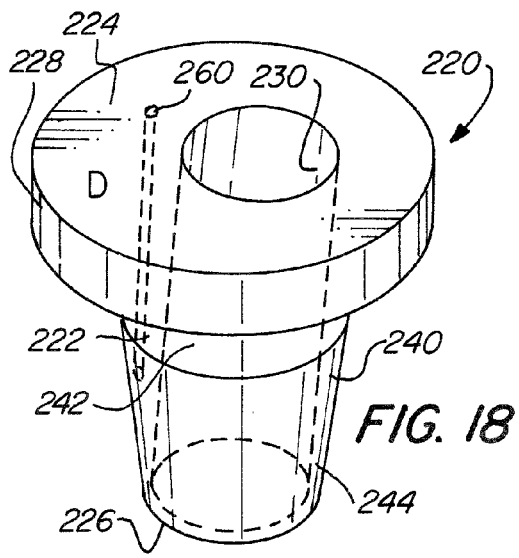
FIG. 18 is a top, front and left side perspective view of a fourth embodiment of a nonspill fuel filler adapter of the present invention adapted for use with a diesel fuel nozzle.
Figure 19:
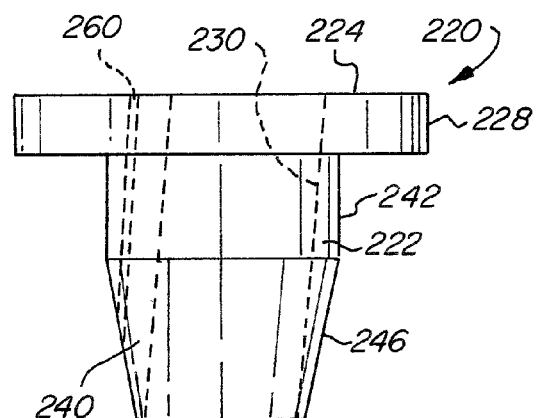
FIG. 19 is a front elevation view thereof.
Figure 21:
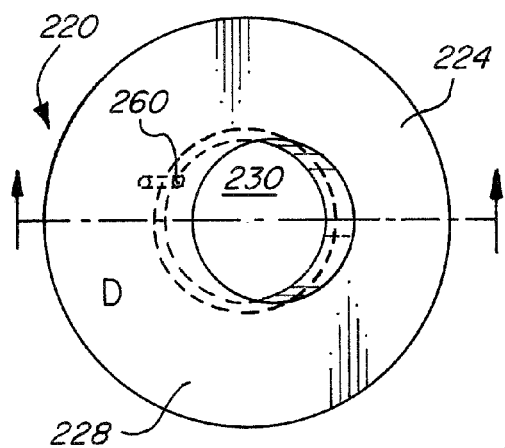
FIG. 21 is a top plan view thereof.
Figure 20:
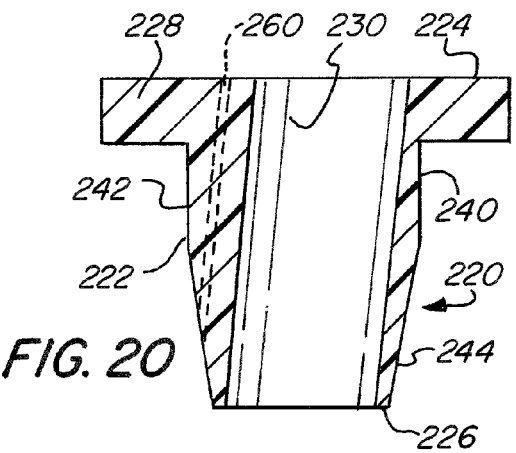
FIG. 20 is a front cross-sectional view thereof.
Figure 22:
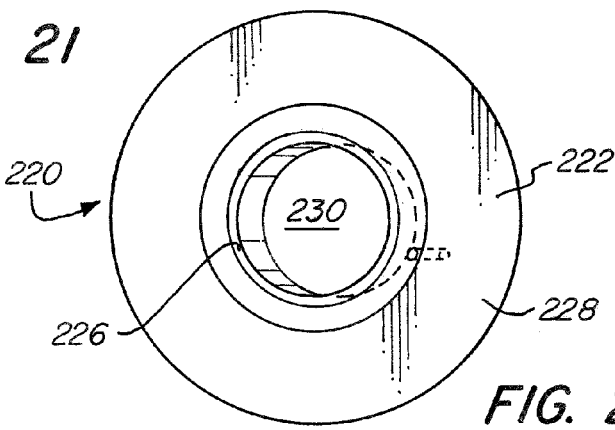
FIG. 22 is a bottom plan view thereof.

Referring now to FIGS. 1-12, first and second embodiments of a fuel filler adapter 20 is shown. The first embodiment of a nonspill fuel filler adapter shown in FIGS. 1-5 is adapted for use with a gasoline fuel nozzle. The second embodiment of a nonspill fuel filler adapter shown in FIGS. 6-10 is adapted for use with a diesel fuel nozzle and is identical in all material respects except for having a different diameter bore. Therefore, the first and second embodiments shall be discussed together below. Fuel filler adapter 20 is a hollow body 22 having a base end 24 and a forward end 26. The forward end 26 of adapter 20 is sized to be positioned into a fuel fill 100 and fuel pipe or hose 102 (as seen in FIGS. 11 and 12).

A fuel fill 100 is the inlet to the fuel system and connects via a fuel pipe or hose 102 to the fuel tank. A fuel nozzle 120 is inserted into the fuel fill 100 and fuel is pumped to the fuel system via the fuel fill 100. The typical design of a fuel fill 100, particularly a deck fill, has two or three different diameter sections. In one example, as seen in FIG. 12, there is an upper larger diameter section 104 that can sealingly receive an upper cover plate of a fuel fill cap, then a transition 105 to a middle smaller diameter section 106 that is threaded and receives and engages with the threaded body of the fuel fill cap, and a transition 107 to a lower smallest diameter section 108. The lower smallest diameter section 108 is sized so fuel pipe or hose 102 slides snugly and sealingly onto the outer walls 109 of lower smallest diameter section 108.

In a preferred embodiment of the invention, the body 22, particularly the forward end 26 of adapter 20, is sized to be positioned into a lower smallest diameter section 108 of fuel fill 100 as seen in FIG. 12. In other embodiments the body 22 and/or the forward end 26 is sized to be positioned into the middle smaller diameter section 106.

A flange 28 extends outwardly from the base end 24 of the body and is sized so that it is larger than a selected part of the fuel fill 100 such that the flange 28 prevents the adapter 20 from falling into the fuel fill 100 and pipe 102. For example, in the embodiment where the body 22 is sized to be positioned into a lower smallest diameter section 108 of fuel fill 100, the flange 28 is sized to seat into the transition 107 to retain the adapter 20 in the fuel fill 100. In the embodiment where body 22 is sized to be positioned into the middle smaller diameter section 106, the flange 28 is sized to seat into the transition 105 to retain the adapter 20 in the fuel fill 100.

The fuel filler adapter 20 has a length of between 1.0 inch and 2.5 inches, preferably between 1.5 inch and 2.0 inches.

As seen in FIGS. 3, 4, 5, and 8, 9, 10, a bore 30 extends through the body 22 from the base end 24 to the forward end 26. Bore 30 extends at an angle A of between 2.5° and 15° relative to a central axis of the body 22. Preferably, the bore 30 extends through the body 22 at an angle of between 5° and 10° relative to the central axis of the body 22, and most preferably, the bore 30 extends through the body 22 at an angle of 7° relative to the central axis of the body 22.

The bore 30 is sized to receive a fuel pump nozzle 120, and the bore angle is selected such that when the fuel filler adapter 20 is fitted onto a fuel pump nozzle 120, and the nozzle 120 and adapter 20 are placed in a fuel fill 100, the fuel nozzle 120 will be positioned with the nozzle tip 122 located adjacent to and/or against the inner wall 110 of the vehicle's fuel pipe or hose 102. Fuel 124 which is pumped into the fuel fill 100 will flow onto the inner wall 110 and will tend to follow a helical path 112 along the inner wall 110 of the fuel pipe or hose 102. This helical or vortex path 112 of fuel 124 is advantageous because it leaves a central area 114 in the center of the fuel pipe or hose 102 clear of fuel. Displaced air exiting the fuel tank as the tank fills with fuel can exit up the central area 114 without blocking the flow of fuel 124. Air can therefore continuously escape the fuel tank as it is filled with fuel. The escaping air is then vented to the atmosphere via the fuel filler adapter 20. In this way, the problem of fuel spitback is eliminated.

In one embodiment, illustrated in FIGS. 1-5, the fuel filler adapter 20 is sized to receive a gasoline pump nozzle, and the bore has a diameter of 0.825 inch. In such case, preferably, the body 22 is provided with in whole or in part with a red coloration and/or the letter "G" or word "Gas" to indicate that the particular adapter in sized for use with a gasoline pump nozzle. For example, a red letter "G" may be inscribed in the adapter 20.

In another embodiment, illustrated in FIGS. 6-10, the fuel filler adapter 20 is sized to receive a diesel pump nozzle, and the bore has a diameter of 0.950 inch. In such case, preferably, the body 22 is provided with in whole or in part with a green coloration and/or the letter "D" or word "Diesel" to indicate that the particular adapter in sized for use with a diesel pump nozzle. For example, a green letter "D" may be inscribed in the adapter 20.

Figure 1:
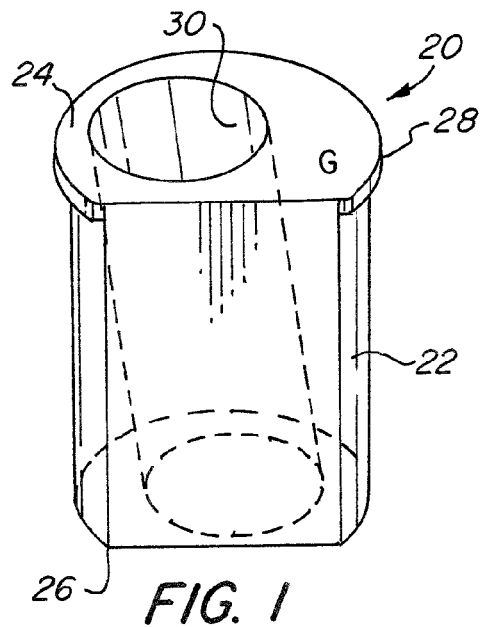
FIG. 1 is a top, front and left side perspective view of a first embodiment of a nonspill fuel filler adapter of the present invention adapted for use with a gasoline fuel nozzle.
Figure 3:
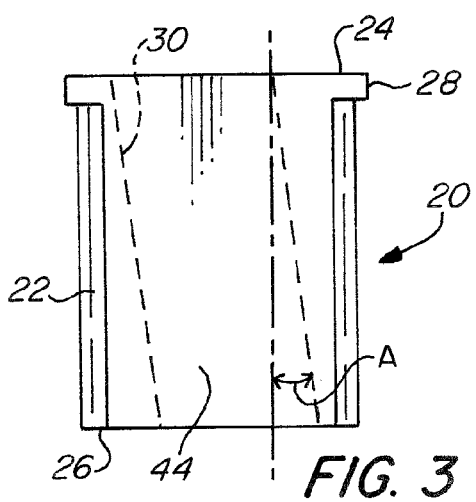
FIG. 3 is a front elevation view thereof.
Figure 2:
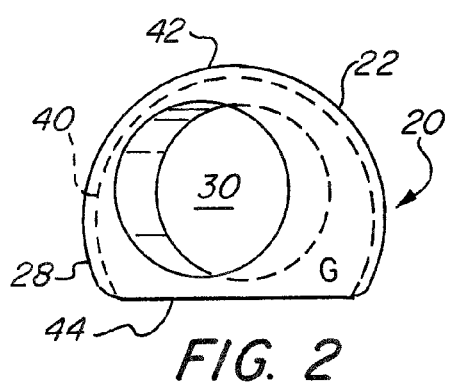
FIG. 2 is top plan view thereof.
Figure 4:
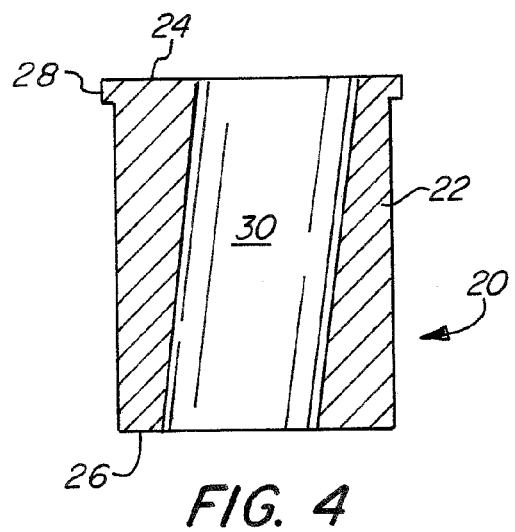
FIG. 4 is a rear cross-sectional view thereof.
Figure 5:
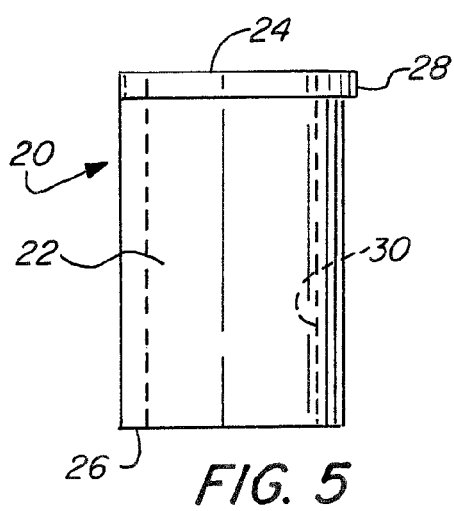
FIG. 5 is a left side elevation view thereof.
Figure 6:
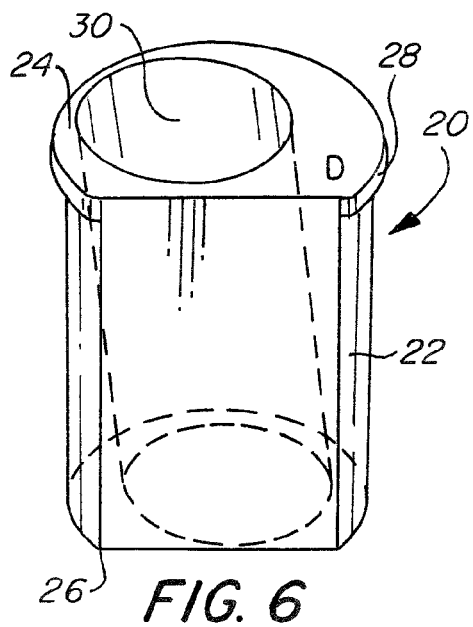
FIG. 6 is a top, front and left side perspective view of a second embodiment of a nonspill fuel filler adapter of the present invention adapted for use with a diesel fuel nozzle.
Figure 8:
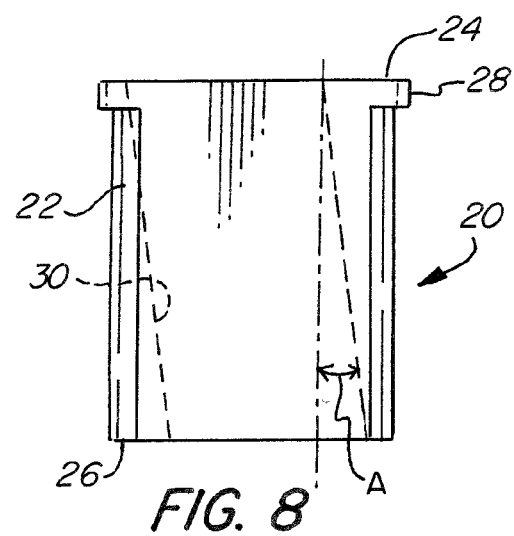
FIG. 8 is a front elevation view thereof.
Figure 7:
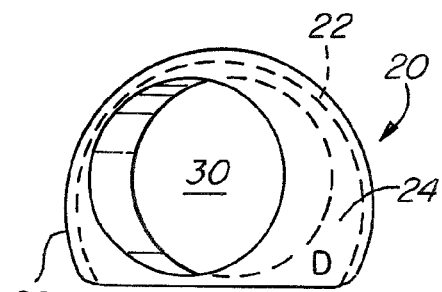
FIG. 7 is top plan view thereof.
Figure 9:
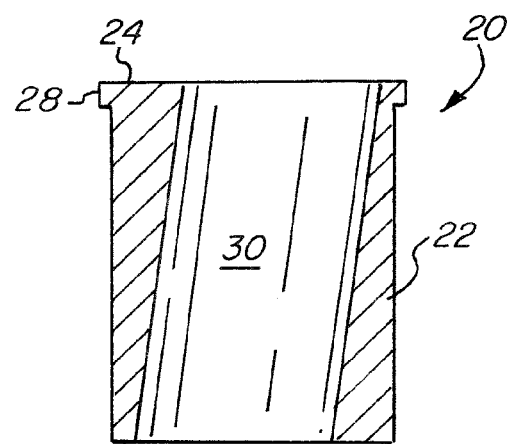
FIG. 9 is a rear cross-sectional view thereof.
Figure 10:
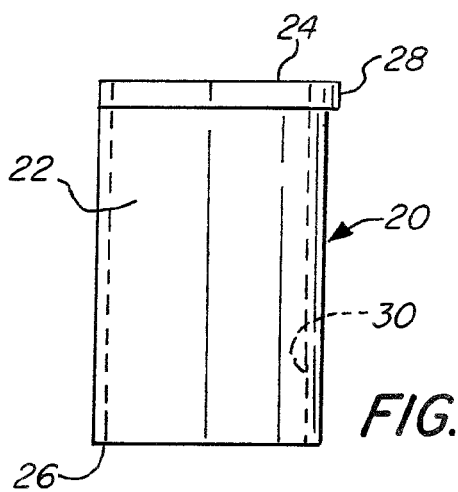
FIG. 10 is a left side elevation view thereof.

The body 22 has outer walls 40 that have a curved cross-sectional shape, which is preferably a circle, or more preferably, a partial circular shape having a curved area 42 and a flat area 44, which are sized as described above to seat in the fuel fill 100. In the first and second embodiments as seen in FIGS. 2 and 7, outer walls 40 are a partial circular shape which is a truncated circle cross-sectional shape. The truncated circle cross-sectional shape is particularly effective as the body 22 seats into the lower smallest diameter section 108 of fuel fill 100 or the middle smaller diameter section 106, and a vent space 116 is left between the flat area 44 and the surrounding walls of the fuel fill 100. Vent space 116 receives exiting air which has been displaced from the fuel tank and directed up through the central area 114 of fuel pipe/hose 102 and releases the air from the fuel system into the atmosphere. In this embodiment, the fuel filler adapter body 22 has outer walls 40 having a substantially constant cross-sectional shape.

Figure 23:
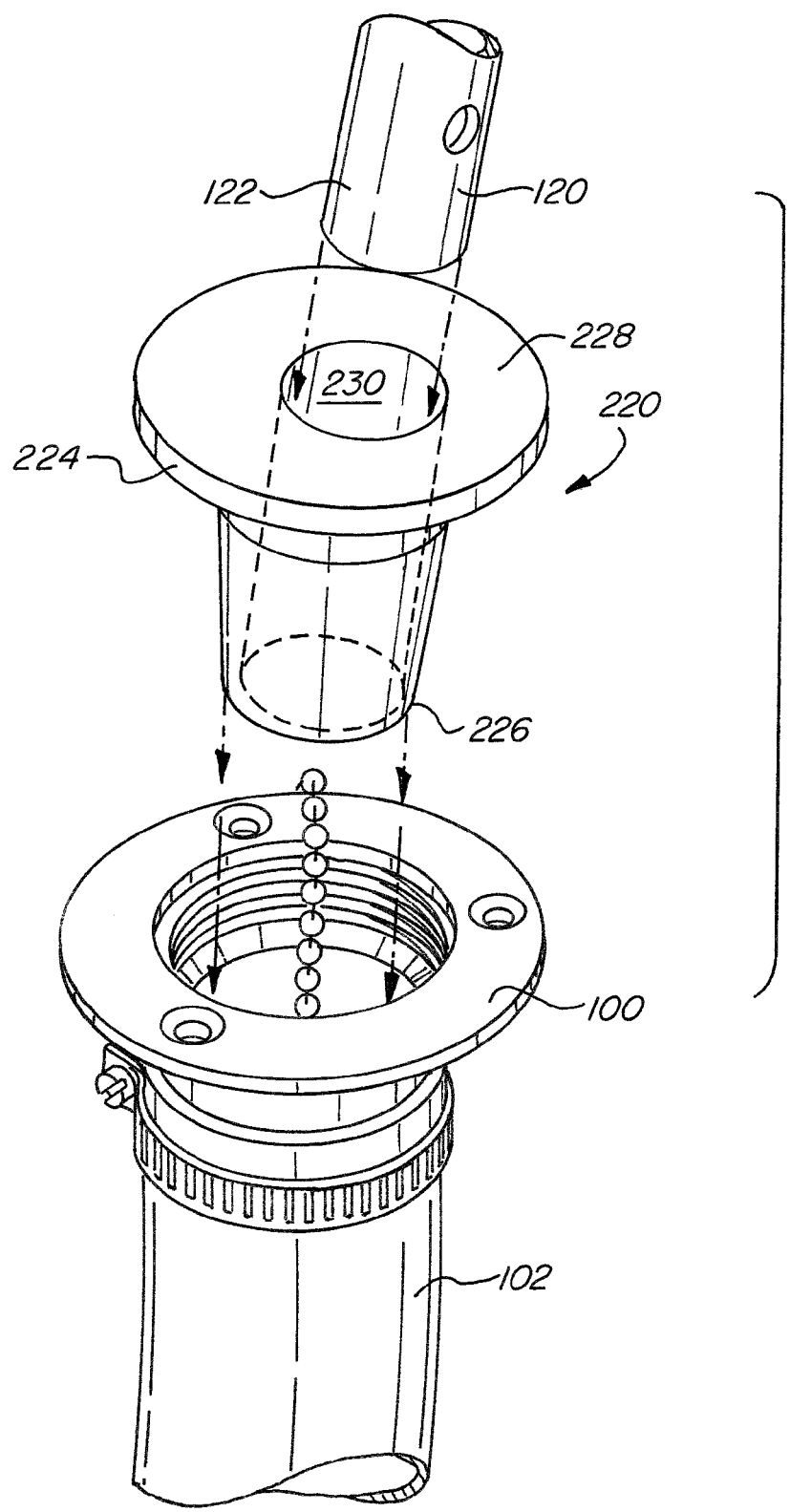
FIG. 23 is a perspective exploded view showing a fuel nozzle, a nonspill fuel filler adapter in accordance with FIG. 13 or 18, and a fuel fill and fuel pipe/hose.
Figure 24:
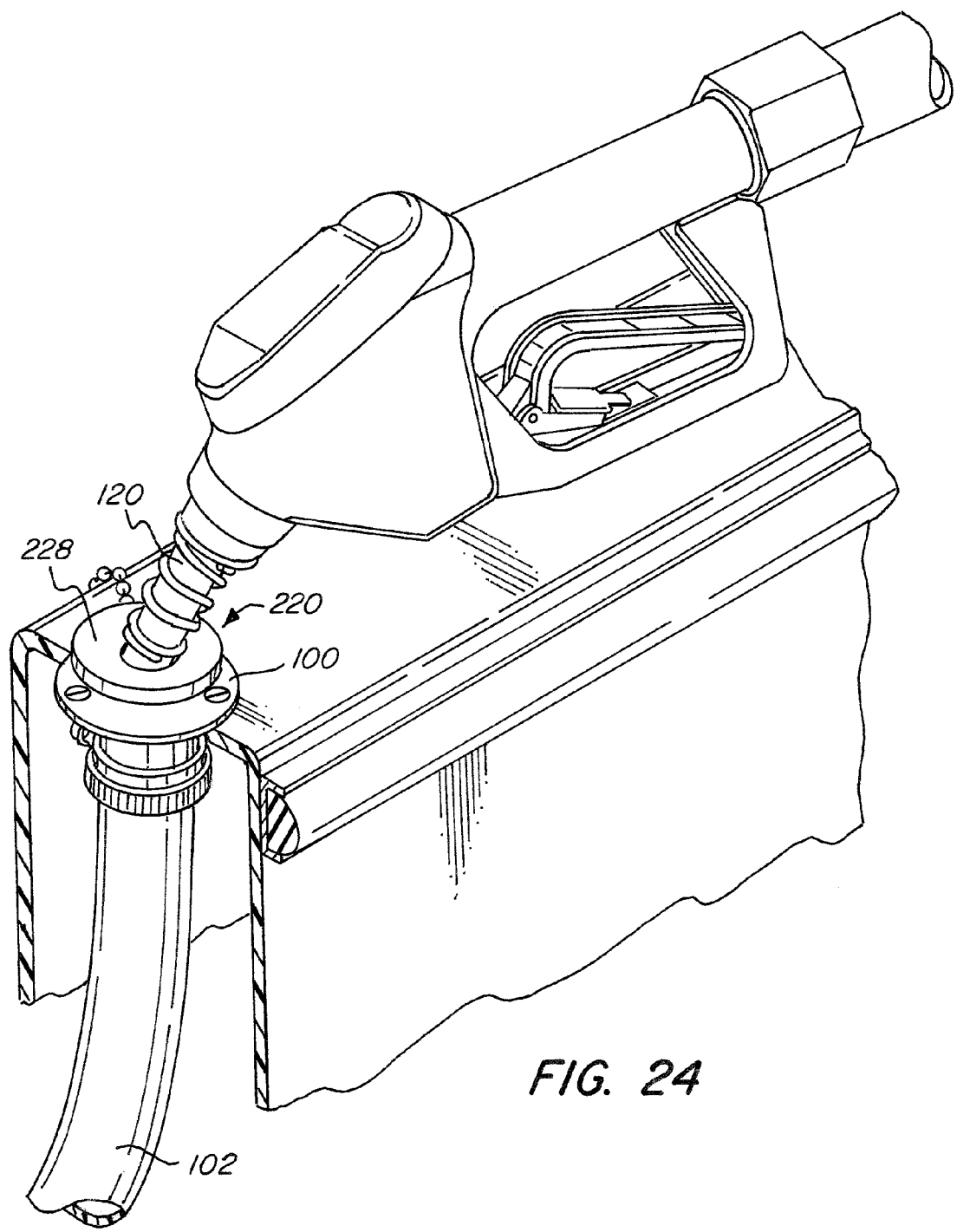
FIG. 24 is a perspective view showing a fuel nozzle, a nonspill fuel filler adapter in accordance with FIG. 13 or 18, and a fuel fill and fuel pipe/hose visible in a partial cutaway view, with the fuel nozzle located in the fuel fill and fuel pipe/hose.
Figure 25:
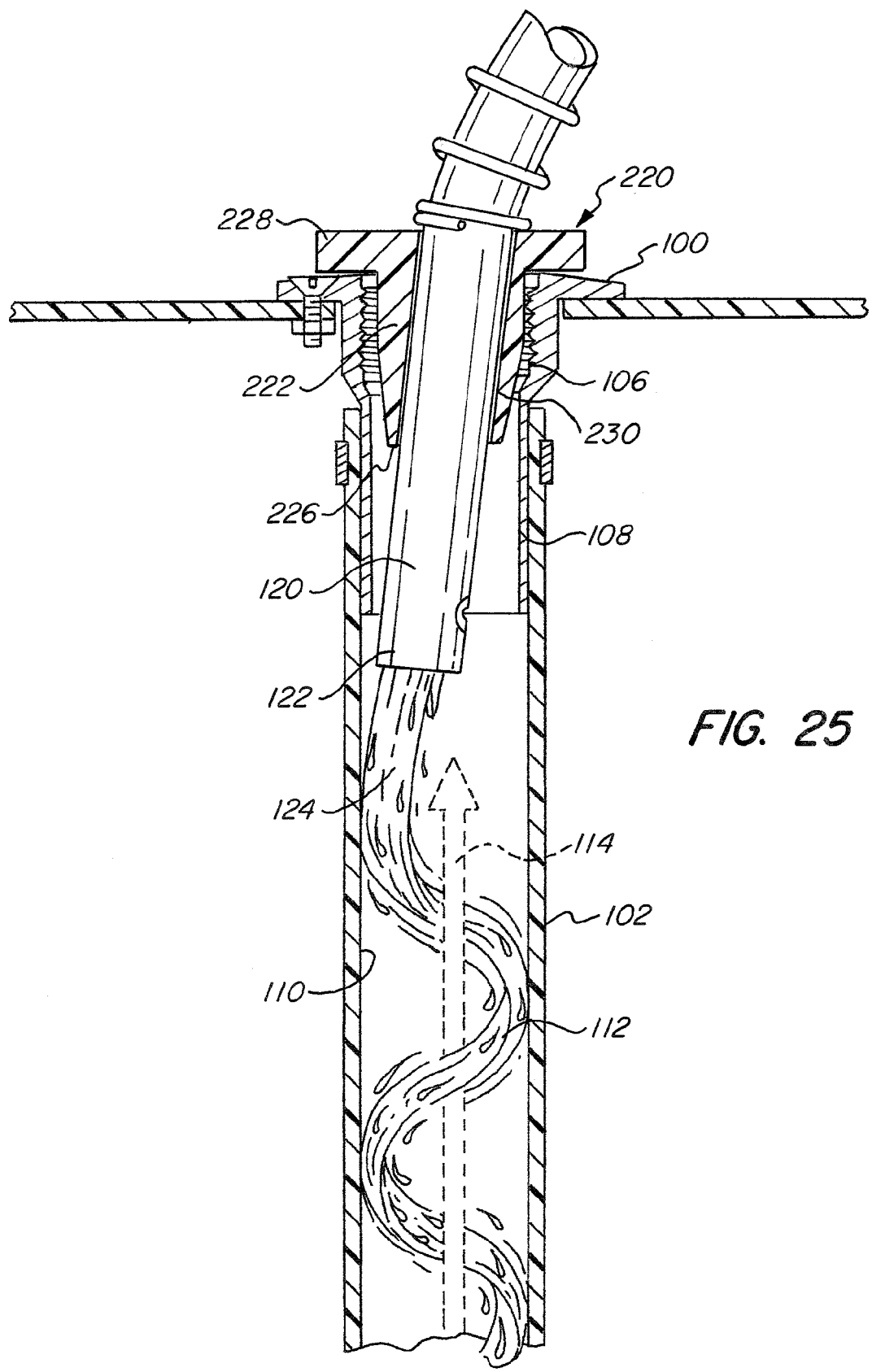
FIG. 25 is a cross-section view showing the fuel nozzle, nonspill fuel filler adapter in accordance with FIG. 13 or 18, fuel fill and fuel pipe/hose of FIGS. 23 and 24 with fuel being dispensed from the fuel nozzle into the fuel fill and fuel pipe/hose.
Figure 26:
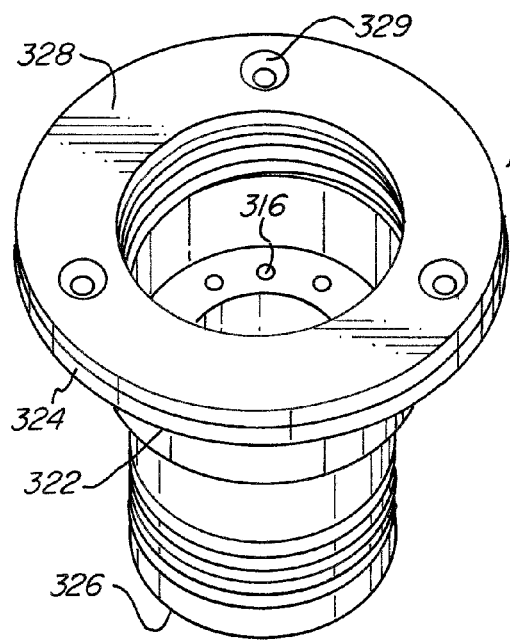
FIG. 26 is a top, front and left side perspective view of an embodiment of a nonspill fuel filler inlet of the present invention adapted for mounting on a boat deck or gunwale and connection to a fuel pipe/hose.
Figure 27:
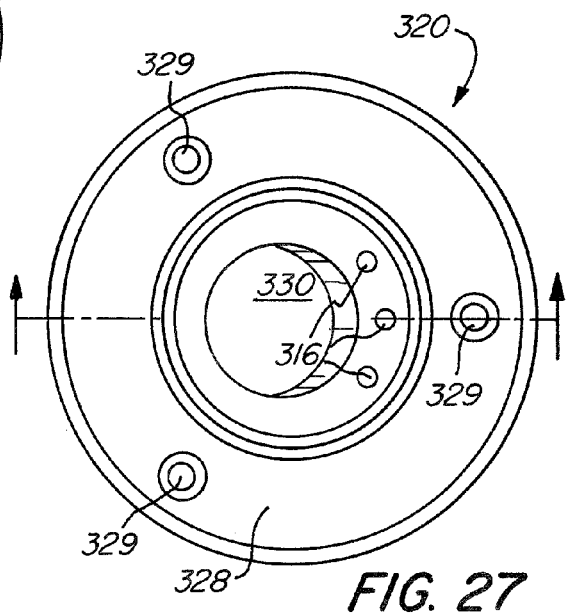
FIG. 27 is a top plan view thereof.
Figure 28:
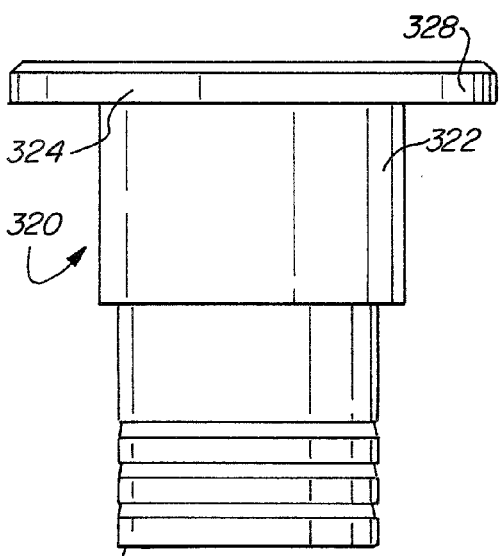
FIG. 28 is a left side elevation view thereof.
Figure 29:
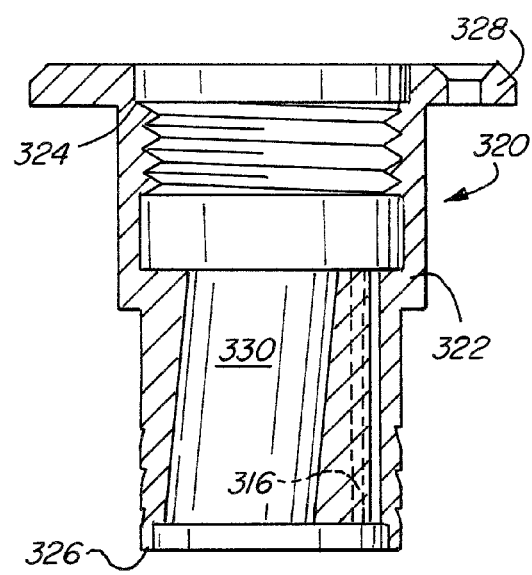
FIG. 29 is a left side cross-sectional view thereof.
Figure 30:
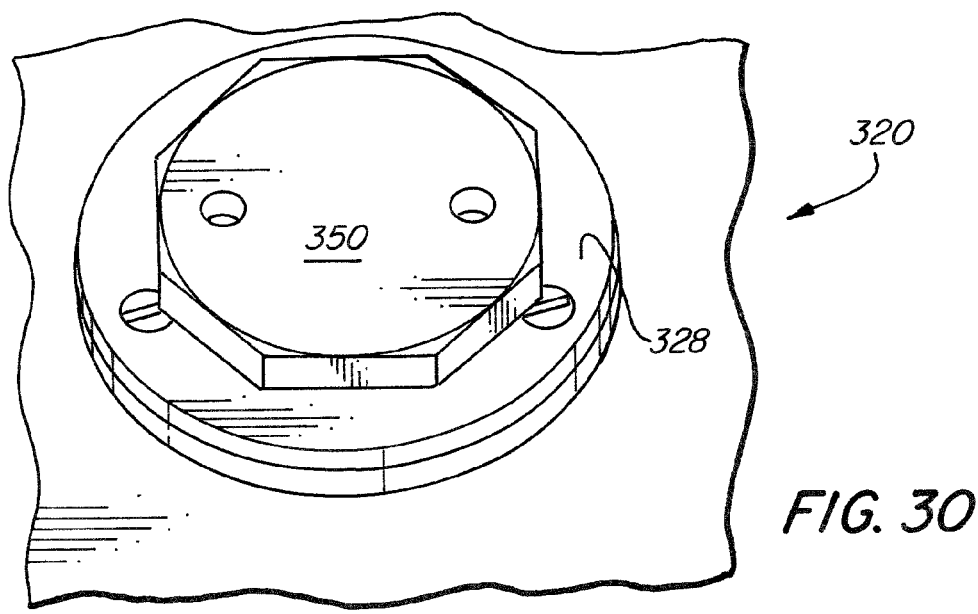
FIG. 30 is a top perspective view thereof showing the nonspill fuel filler inlet mounted on a boat deck or gunwale with a fuel cap placed therein.
Figure 31:
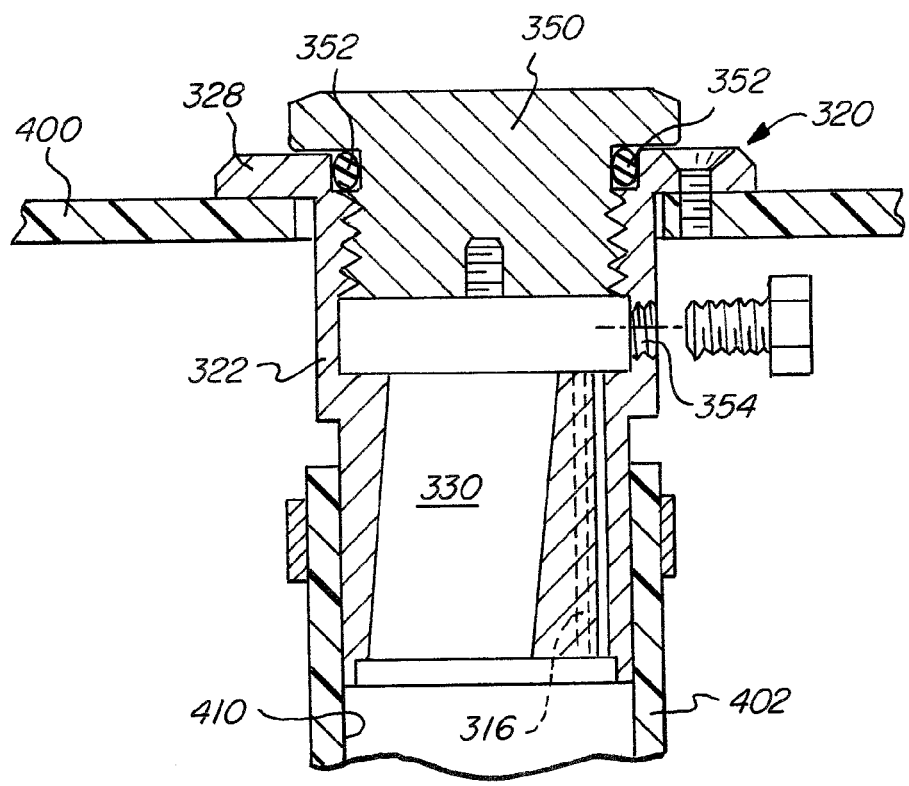
FIG. 31 is a left side cross-sectional view thereof.
Figure 32:
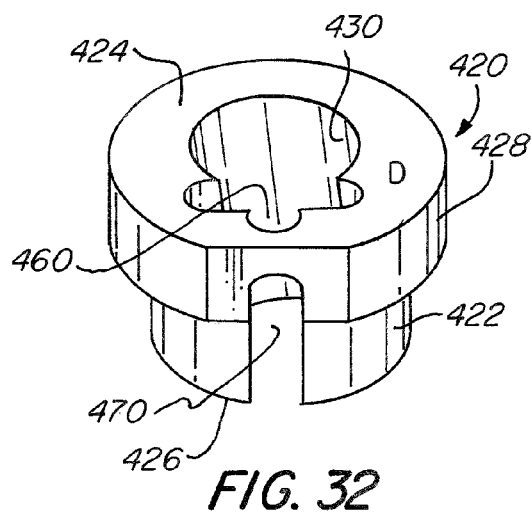
FIG. 32 is a top and front perspective view of a fifth embodiment of a nonspill fuel filler adapter of the present invention.
Figure 33:
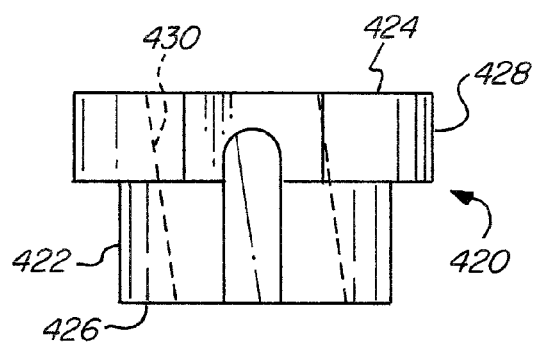
FIG. 33 is a front elevation view thereof.
Figure 34:
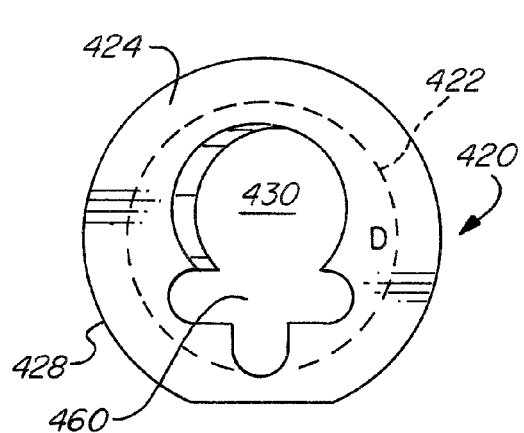
FIG. 34 is a top plan view thereof.
Figure 35:
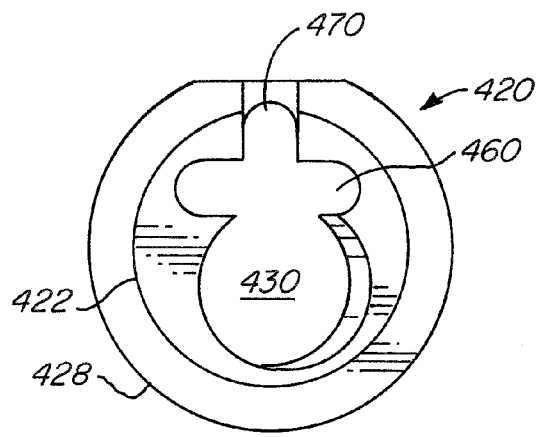
FIG. 35 is a bottom plan view thereof.

Referring now to FIGS. 13-25, third and fourth embodiments of a fuel filler adapter 220 is shown. The third embodiment of a nonspill fuel filler adapter shown in FIGS. 13-17 is adapted for use with a gasoline fuel nozzle. The fourth embodiment of a nonspill fuel filler adapter shown in FIGS. 18-22 is adapted for use with a diesel fuel nozzle and is identical in all material respects except for having a different diameter bore. Accordingly the third and fourth embodiments shall be discussed together below. Fuel filler adapter 220 is a hollow body 222 having a base end 224 and a forward end 226. The forward end 226 of adapter 220 is sized to be positioned into a fuel fill 100 and fuel pipe or hose 102 (as seen in FIGS. 23-25).

In a preferred embodiment of the invention, the body 222, particularly the forward end 226 of adapter 220, is tapered. The tapered forward end is sized to be positioned into either the lower smallest diameter section 108 or the middle smaller diameter section 106 of fuel fill 100.

Body 222 has a flange 228 which extends outwardly from the base end 224 of the body 222 and is sized so that it is larger than a selected part of the fuel fill 100 such that the flange 228 prevents the adapter 220 from falling into the fuel fill 100 and pipe 102. Flange 228 is larger than the opening in fuel fill 100. Adapter 220 has a length of between 1.0 inch and 2.5 inches, preferably between 1.5 inch and 2.0 inches.

A bore 230 extends through the body 222 from the base end 224 to the forward end 226. Bore 230 extends at an angle of between 2.5° and 15° relative to a central axis of the body 222. Preferably, the bore 230 extends through the body 222 at an angle of between 5° and 10° relative to the central axis of the body 222, and most preferably, the bore 230 extends through the body 222 at an angle of 7° relative to the central axis of the body 222.

The bore 230 is sized to receive a fuel pump nozzle 120, and the bore angle is selected such that when the fuel filler adapter 220 is fitted onto a fuel pump nozzle 120, and the nozzle 120 and adapter 220 are placed in a fuel fill 100, the fuel nozzle 120 will be positioned with the nozzle tip 122 located adjacent to and/or against the inner wall 110 of the vehicle's fuel pipe or hose 102. Fuel 124 which is pumped into the fuel fill 100 will flow onto the inner wall 110 and will tend to follow a helical path 112 along the inner wall 110 of the fuel pipe or hose 102. This helical or vortex path 112 of fuel 124 is advantageous because it leaves a central area 114 in the center of the fuel pipe or hose 102 clear of fuel. Displaced air exiting the fuel tank as the tank fills with fuel can exit up the central area 114 without blocking the flow of fuel 124. Air can therefore continuously escape the fuel tank as it is filled with fuel. The escaping air is then vented to the atmosphere via the fuel filler adapter 220. In this way, the problem of fuel spitback is eliminated.

In one embodiment, illustrated in FIGS. 13-17, the fuel filler adapter 220 is sized to receive a gasoline pump nozzle, and the bore has a diameter of 0.825 inch. In such case, preferably, the body 222 is provided with in whole or in part with a red coloration and/or the letter "G" or word "Gas" to indicate that the particular adapter in sized for use with a gasoline pump nozzle. For example, a red letter "G" may be inscribed in the adapter 220.

In another embodiment, illustrated in FIGS. 18-22, the fuel filler adapter 220 is sized to receive a diesel pump nozzle, and the bore has a diameter of 0.950 inch. In such case, preferably, the body 222 is provided with in whole or in part with a green coloration and/or the letter "D" or word "Diesel" to indicate that the particular adapter in sized for use with a diesel pump nozzle. For example, a green letter "D" may be inscribed in the adapter 220.

The body 222 has outer walls 240 that are a generally hollow cylindrical section 242 with a hollow truncated conical front end 244. Desirably, venting channels 260 extend through body 222 so that exiting air which has been displaced from the fuel tank and directed up through the central area 114 of fuel pipe/hose 102 is released via the venting channels 260. However, venting channels 260 may be omitted, and venting will be provided as air escapes between the hollow truncated conical front end and the fuel fill 100. A fuel fill 100 typically has a fuel fill cap attached to the inside of the fuel fill 100 by a chain, and the body 222 will be prevented from seating in fuel fill 100 by the chain, this providing open areas through which displaced air may be vented.

Figure 36:
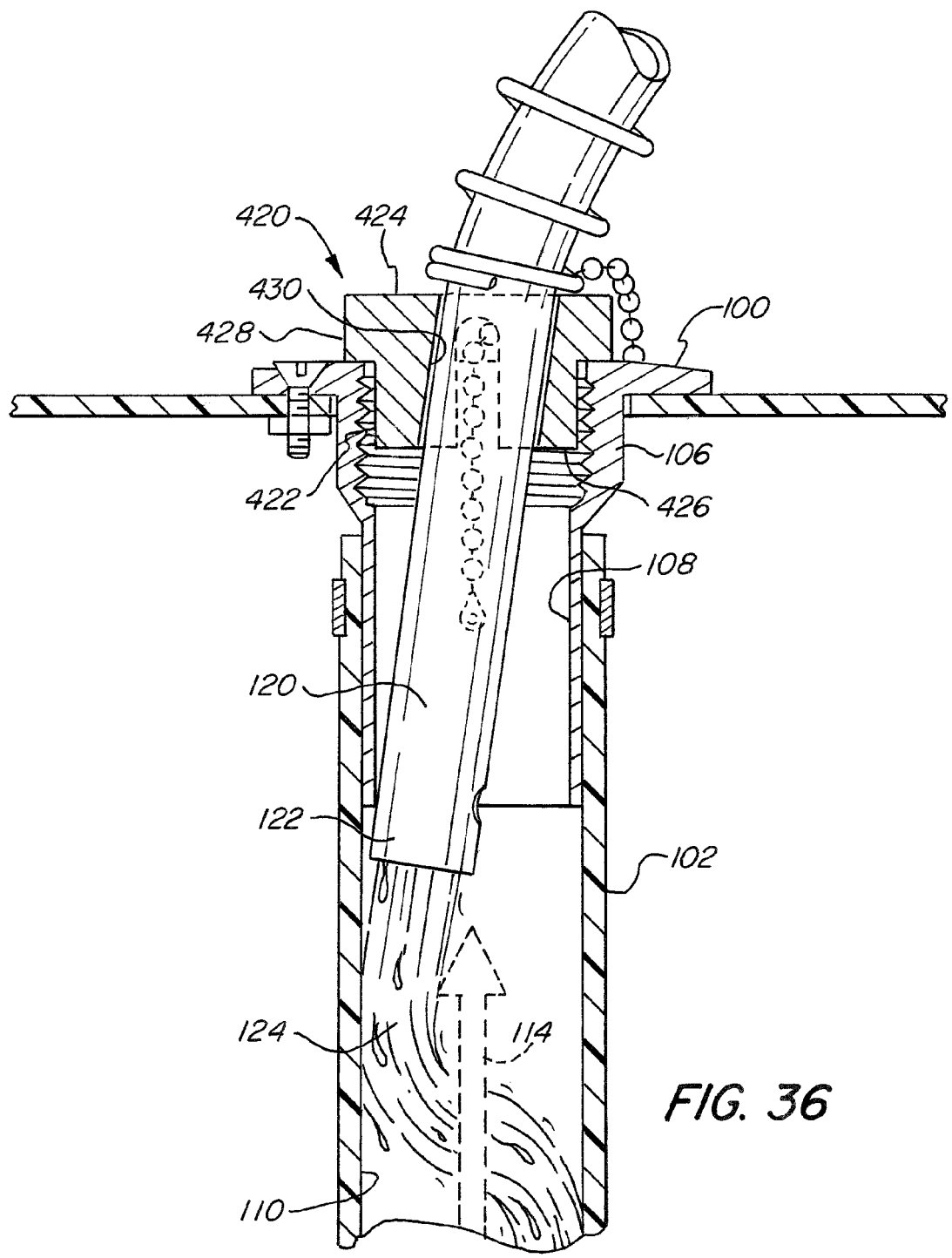
FIG. 36 is a perspective view showing a fuel nozzle, a nonspill fuel filler adapter in accordance with FIG. 32, and a fuel fill and fuel pipe/hose visible in a partial cutaway view, with the fuel nozzle located in the fuel fill and fuel pipe/hose.
Figure 37:
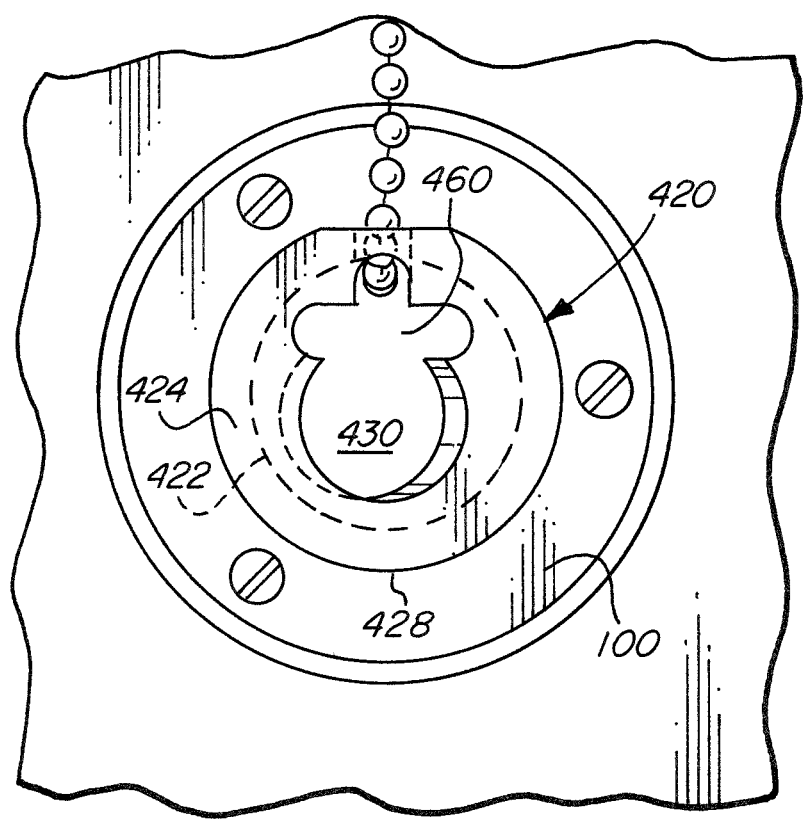
FIG. 37 is a top plan view showing the nonspill fuel filler adapter in accordance with FIG. 32 located in a fuel fill.
Figure 38:
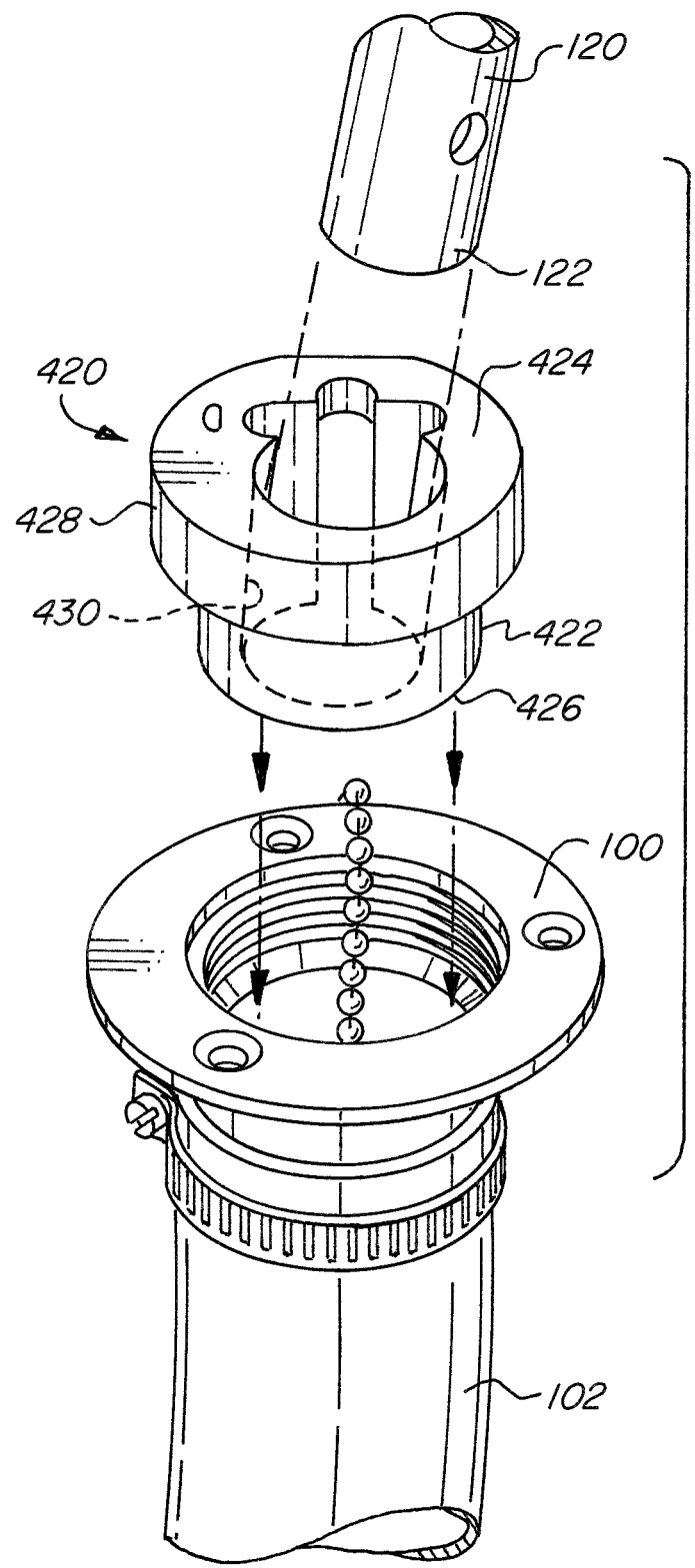
FIG. 38 is a perspective exploded view showing a fuel nozzle, a nonspill fuel filler adapter in accordance with FIG. 32, and a fuel fill and fuel pipe/hose.

Referring now to FIGS. 32-38, a fifth embodiment of a fuel filler adapter 420 is shown. Fuel filler adapter 420 is a hollow body 422 having a base end 424 and a forward end 426. The forward end 426 of adapter 420 is sized to be positioned into a fuel fill 100 and fuel pipe or hose 102 (as seen in FIGS. 36-38).

In a preferred embodiment of the invention, the body 422, particularly the forward end 426 of adapter 220, is generally cylindrical. The forward end 426 is sized to be positioned into either or both of the lower smallest diameter section 108 or the middle smaller diameter section 106 of fuel fill 100.

Body 422 has a flange 428 which extends outwardly from the base end 424 of the body 422 and is sized so that it is larger than the opening of fuel fill 100 such that the flange 428 prevents the adapter 420 from falling into the fuel fill 100 and pipe 102. Adapter 420 has a length of between 0.5 and 1.75 inches, preferably between 1.0 inch and 1.325 inches.

A bore 430 extends through the body 422 from the base end 424 to the forward end 426. Bore 430 extends at an angle of between 2.5° and 15° relative to a central axis of the body 422. Preferably, the bore 430 extends through the body 422 at an angle of between 5° and 10° relative to the central axis of the body 422, and most preferably, the bore 430 extends through the body 422 at an angle of 7° relative to the central axis of the body 422.

One or more venting channels 460 extend through the body 422 so that exiting air which has been displaced from the fuel tank and directed up through the central area 114 of fuel pipe/hose 102 is released via the venting channel 460. In the embodiment shown in FIGS. 32-38, the venting channel 460 is a relatively large oval cutout extending through the body 422. The area of the venting channel 460 is sized to permit air flow to exit the fuel tank without restriction.

The bore 430 is sized to receive a fuel pump nozzle 120, and the bore angle is selected such that when the fuel filler adapter 420 is fitted onto a fuel pump nozzle 120, and the nozzle 120 and adapter 420 are placed in a fuel fill 100, the fuel nozzle 120 will be positioned with the nozzle tip 122 located adjacent to and/or against the inner wall 110 of the vehicle's fuel pipe or hose 102. Fuel 124 which is pumped into the fuel fill 100 will flow onto the inner wall 110 and will tend to follow a helical path 112 along the inner wall 110 of the fuel pipe or hose 102. This helical or vortex path 112 of fuel 124 is advantageous because it leaves a central area 114 in the center of the fuel pipe or hose 102 clear of fuel. Displaced air exiting the fuel tank as the tank fills with fuel can exit up the central area 114 without blocking the flow of fuel 124 and out via the venting channel 460. Air can therefore continuously escape the fuel tank as it is filled with fuel. The escaping air is then vented to the atmosphere via the fuel filler adapter 420. In this way, the problem of fuel spitback is eliminated.

In one embodiment the fuel filler adapter 420 is sized to receive a gasoline pump nozzle, and the bore has a diameter of 0.825 inch. In such case, preferably, the body 422 is provided with in whole or in part with a red coloration and/or the letter "G" or word "Gas" to indicate that the particular adapter in sized for use with a gasoline pump nozzle. For example, a red letter "G" may be inscribed in the adapter 420. In another embodiment, the fuel filler adapter 420 is sized to receive a diesel pump nozzle, and the bore has a diameter of 0.950 inch. In such case, preferably, the body 422 is provided with in whole or in part with a green coloration and/or the letter "D" or word "Diesel" to indicate that the particular adapter in sized for use with a diesel pump nozzle. For example, a green letter "D" may be inscribed in the adapter 420.

The body 422 has outer walls 440 that are a generally hollow cylindrical section 442. A fuel fill 100 typically has a fuel fill cap attached to the inside of the fuel fill 100 by a chain. Body 422 has a slot 470 to allow the chain to pass through fuel filler adapter 420 so that the fuel filler adapter 420 can be seated squarely in fuel fill 100.

Adapters 20, 220, 420 may be formed of metal or plastic. In one preferred embodiment, adapters 20, 220, 420 are fabricated from stainless steel. In another embodiment, adapters 20, 220, 420 are fabricated from a durable plastic or a filled plastic such as polycarbonate or polybenzimidazole (PBI). If a plastic material is used, the entire adapter 20, 220, 420 may be tinted green or red to identify its use for diesel or gasoline respectively.

Referring now to FIGS. 26-31, another embodiment of the invention is a fuel fill 320 provided for use in new boat construction or retrofitting in an existing boat. Preferably, fuel fill 320 is formed of metal, preferably stainless steel or aluminum. The fuel fill 320 is adapted to connect to a fuel pipe or hose 402 and has a hollow cylindrical body 322 having a base end 324 and a forward end 326. Base end 324 has a surrounding flange 328. Flange 328 is adapted to be seated on a boat deck or gunwale 400 and is retained by screws in screw holes 329. Fuel fill bore 330 extends through the body 322 at an angle of between 2.5° and 15° relative to a central axis of the body 322. Preferably, the bore 330 extends through the body 322 at an angle of between 5° and 10° relative to the central axis of the body 322. Most preferably, the bore 330 extends through the body 322 at an angle of 7° relative to the central axis of the body 322. In one diesel fuel embodiment, the bore 300 has a diameter of 0.950 inch and at least part of the body 322 is colored green. In another gasoline embodiment, the bore 330 has a diameter of 0.825 inch and at least part of the body 322 is colored red.

Fuel fill 320 has a fuel cap 350 that screws into body 322. Cap 350 has a gasket 352 to seal the cap 350 and prevent fuel loss. Optionally, body 322 has a lateral bore 354 which connects to a fuel system overpressure venting system. One or more venting channels 316 extend through the body 322 to permit venting of air through the fuel fill 320. In the embodiment shown in FIGS. 26, 27 and 29, the venting channels 316 are smaller holes; however, it is more preferable that the venting channels have a larger area than shown in FIGS. 26 and 27, for example, preferably the venting channels 316 have a size and shape similar to the large oval cutout 460 seen in FIGS. 32-25 to accommodate the air flow exiting the fuel tank.

The forward end 326 of fuel fill 320 is connected to a fuel pipe or hose 402. As discussed above and as illustrated with respect to the adapters 20, 220, the bore 330 is sized to receive a fuel pump nozzle, and the bore angle is selected such that when the fuel pump nozzle is placed in fuel fill 320, the nozzle will be positioned with the nozzle tip located adjacent to and/or against the inner wall 410 of the fuel pipe or hose 402. Fuel which is pumped into the fuel fill 320 will flow onto the inner wall 410 and will tend to follow a helical path along the inner wall 410 of the fuel pipe or hose 402. This helical or vortex path of fuel allows a central area in the center of the fuel pipe or hose 402 to be clear of fuel. Displaced air exiting the fuel tank as the tank fills with fuel can exit up the central area without blocking the flow of fuel. Air can therefore continuously escape the fuel tank as it is filled with fuel. The escaping air is then vented to the atmosphere via the venting channel 316. In this way, the problem of fuel spitback is eliminated.

It should be understood that the foregoing is illustrative and not limiting, and that obvious modifications may be made by those skilled in the art without departing from the spirit of the invention. Accordingly, reference should be made primarily to the accompanying claims, rather than the foregoing specification, to determine the scope of the invention.

What is claimed is:

1. A fuel filler adapter comprising:
   a hollow body having a base end and a forward end, wherein the body base end has outer walls, the body base end outer walls having a substantially constant cross-sectional shape;
   the body having a fuel-inlet bore extending through the body from the base end to the forward end at an angle of between 2.5° and 15° relative to a central axis of the body; and
   the fuel-inlet bore having at least one vent channel provided therewith;
   wherein the adapter is sized to fit into a fuel fill;
   wherein the fuel inlet bore is sized to receive a fuel pump nozzle, whereby the fuel-inlet bore angle positions the fuel pump nozzle adjacent to an inner wall of a fuel pipe whereby fuel pumped into the fuel fill flows along the inner wall in a helical path with a central area in the center of the fuel pipe clear of fuel; and
   wherein air flows through the central area and exits via the at least one vent channel of the body.

2. The fuel filler adapter of claim 1, wherein the fuel-inlet bore extends through the body at an angle of between 5° and 10° relative to the central axis of the body.

3. The fuel filler adapter of claim 2, wherein the fuel-inlet bore extends through the body at an angle of 7° relative to the central axis of the body.

4. The fuel filler adapter of claim 1, wherein the base end of the body comprises a flange extending outwardly from the body.

5. The fuel filler adapter of claim 1, wherein the body has outer walls having a substantially constant cross-sectional shape.

6. The fuel filler adapter of claim 1, wherein the body has outer walls having a cross-sectional shape having curved areas.

7. The fuel filler adapter of claim 6, wherein the body outer walls have a circular cross-sectional shape.

8. The fuel filler adapter of claim 1, wherein the body has a cylindrical or conical forward end.

9. The fuel filler adapter of claim 1, wherein the body has a length of between 0.5 inch and 2.5 inches.

10. The fuel filler adapter of claim 1, wherein the body has a length of between 1.0 inch and 2.0 inches.

11. The fuel filler adapter of claim 1, wherein the fuel-inlet bore has a diameter of 0.825 inch.

12. The fuel filler adapter of claim 11, wherein the body is provided in whole or in part with a red coloration.

13. The fuel filler adapter of claim 1, wherein the fuel-inlet bore has a diameter of 0.950 inch.

14. The fuel filler adapter of claim 13, wherein the body is provided in whole or in part with a green coloration.

15. A fuel filler adapter comprising:
    a hollow body having a base end and a forward end
    the body having a bore extending through the body from the base end to the forward end at an angle of between 2.5° and 15° relative to a central axis of the body;
    wherein the adapter is sized to fit into a fuel fill; and
    wherein the bore is sized and shaped to receive a fuel pump nozzle, whereby the bore shape retains the fuel pump nozzle in position and the bore angle positions the fuel pump nozzle adjacent to an inner wall of a fuel pipe whereby fuel pumped into the fuel fill flows along the inner wall in a helical path with a central area in the center of the fuel pipe clear of fuel; and wherein the bore is shaped to include a venting channel whereby air flows through the central area and exits via the venting channel to eliminate fuel spitback; and wherein the body base end has outer walls, the body base end outer walls having a substantially constant cross-sectional shape.

16. The fuel filler adapter of claim 15, wherein the bore extends through the body at an angle of 7° relative to the central axis of the body.

17. The fuel fill adaptor of claim 15, wherein the body has a length of between 0.5 inch and 2.5 inches.

18. The fuel fill adaptor of claim 15, wherein the base end of the body comprises a flange extending outwardly from the body.

19. A fuel fill, comprising:
a hollow cylindrical body having a flanged base end, the flanged base end having outer walls having a substantially constant cross-sectional shape;
a fuel inlet bore extending through the body at an angle of between 2.5° and 15° relative to a central axis of the body; and
the bore including one or more venting channels;

wherein the bore is sized to receive a fuel pump nozzle, whereby the bore angle positions the fuel pump nozzle adjacent to an inner wall of a fuel pipe whereby fuel pumped into the fuel fill flows along the inner wall in a helical path with a central area in the center of the fuel pipe clear of fuel and air exits via the central area to the venting channels.

20. The fuel fill of claim 19, wherein the bore extends through the body at an angle of between 5° and 10° relative to the central axis of the body.

21. The fuel fill of claim 19, wherein the bore has a diameter of 0.950 inch and at least part of the body is colored green.

22. The fuel fill of claim 19, wherein the bore has a diameter of 0.825 inch and at least part of the body is colored red.

* * * * *